Oct. 22, 1935.　　　M. F. CARR　　　2,018,635
SEPARABLE SNAP FASTENER
Filed Jan. 12, 1933
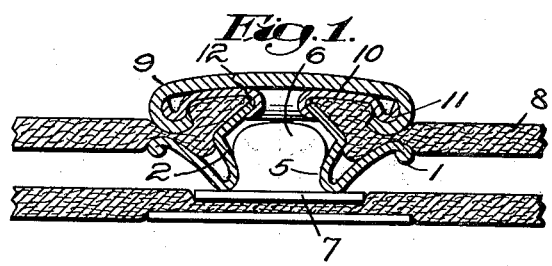
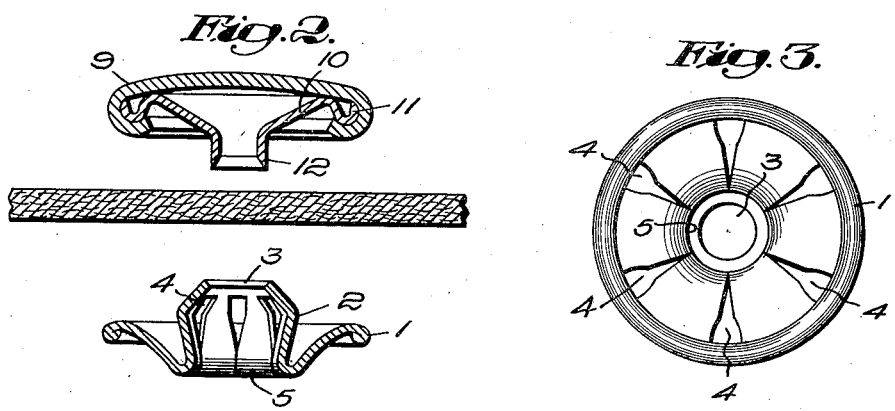
Inventor:
Moses F. Carr:
by Emery, Booth, Varney & Townsend
Attys Patented Oct. 22, 1935

2,018,635

UNITED STATES PATENT OFFICE 2,018,635

SEPARABLE SNAP FASTENER

Moses F. Carr, Lincoln, Mass., assignor to United-Carr Fastener Corporation, Cambridge, Mass., a corporation of Massachusetts Application January 12, 1933, Serial No. 651,293

1 Claim. (Cl. 24—216)

My invention aims to provide improvements in separable snap fasteners.

In the drawing which illustrates a preferred embodiment of my invention:—

Figure 1 is a horizontal section through a complete fastener installation, the stud member being shown in elevation;

Fig. 2 is a vertical section through the parts of the socket installation before assembly; and Fig. 3 is an under side plan view of the socket member.

My invention as illustrated by the annexed drawing is directed particularly to improvements in snap fastener sockets and installations thereof. It is an object of my invention to provide a simple, durable, one-piece socket part which is adapted to be attached to a carrying medium by means of a self-piercing rivet. However, the socket member per se presents several novel features irrespective of the manner of attachment.

The socket member illustrated is formed from a single piece of sheet metal and has a reinforced rim 1 formed by rolling over the outer periphery of the socket member. The central portion of the socket member is suitably formed to provide a stud-receiving boss 2 (Fig. 2) arranged in such a manner that the rim 1 is in a plane about midway between the ends of the boss 2. The upper end of the boss is provided with an aperture 3 to permit passage of an attaching element. The socket including the boss is divided by a series of radial slits 4 (Fig. 3) which extend from a point adjacent to the aperture 3 to the rim 1, thereby dividing the entire socket into a plurality of yieldable stud-engaging portions 4a connected at both ends. These yieldable portions 4a are substantially U-shaped in cross-section adjacent to the stud-receiving aperture 5 so that they may yield more readily than would be possible if the boss 2 did not extend upwardly and above the plane of the rim 1. The upper end of the boss 2 flares outwardly and then inwardly so that it is substantially larger than the head 6 of a cooperating stud 7 (Fig. 1) which enters the boss 2. Therefore, the particular shape of the socket is to a large extent important in permitting proper action of the expansible portions of the socket, especially when the ends are connected as in the structure illustrated. The general size and shape of the yieldable portions 4a permit ease of expansion of the yieldable portions especially adjacent to the stud-receiving aperture 5.

The socket member as illustrated in the drawing is secured to a flexible carrying medium 8 by means of a self-piercing rivet preferably concealed by a cap 9. The rivet has a base 10 which is dished in cross-section so that it may be deformable and has its outer peripheral portion provided with a rim flange 11 for the purposes hereinafter described. A tubular, self-piercing rivet portion 12, of relatively small diameter, extends from the deformable portion of the base at the center of the rivet. The cap member 9 has its peripheral portion rolled over and under the rim flange 11 of the rivet, thereby substantially enclosing all of the rivet except the projecting tubular portion 12.

To attach the members of the socket structure to opposite sides of the carrying medium 8 any suitable mechanism may be used which will move the fastener elements toward each other with the carrying medium between them. During the approaching operation the boss 2 and rivet portion 12 contact with opposite faces of the carrying medium 8 and then the sharp edged rivet portion 12 cuts its own way through the carrying medium thereby eliminating the necessity for first punching a hole in the carrying medium. During the attaching operation a suitable die member is used to engage the inner surface of the boss 2 adjacent to the upper end so that the boss will not collapse at the time that the deformable portion of the base 10 of the rivet is flattened. Therefore, when the socket installation is complete the boss 2 has its upper end portion located within the space surrounded by the cap and provided by the flange 11 of the rivet member. It will be noted (Fig. 1) that the U-shaped portions of the socket stand away from the under side of the carrying medium so that they can yield freely without interference from the carrying medium.

My improved socket installation and socket member construction provide a strong, durable attachment because the rim portion 1 and the turned under portion of the cap 10 grip the carrying medium 8 (Fig. 1) tightly between them. Therefore, during engagement and disengagement of the socket with the stud 7 all of the movement of the yieldable parts of the socket relative to the carrying medium occurs without affecting the grip on the carrying medium between the members as referred to above.

Since the U-shaped portions of the socket which surround the stud-receiving aperture 5 stand away from the carrying medium 8, they will be subjected to crushing stresses, especially when used on garments which must be laundered. To prevent crushing of the socket member I have shaped and arranged the yieldable portions in such a manner that their side edges contact, or at least substantially contact, with the side edges of adjacent yieldable portions at the stud-receiving aperture. Therefore, since a crushing stress would tend to reduce the diameter of the stud-receiving aperture the side edges of the yieldable portions will contact thereby in effect providing a continuous wall.

While I have illustrated and described a preferred embodiment of my invention I do not wish to be limited thereby, because the scope of my invention is best defined by the following claim.

A snap fastener socket member formed from a single piece of sheet metal and having a rolled reinforced continuous rim, a central dome-shaped stud-receiving portion, extending at both sides of the plane of the rolled rim, said socket being divided by slits into a series of yieldable stud-engaging portions surrounding an aperture leading into said dome-shaped stud-receiving portion, and one end of each of said slits terminating adjacent to said rolled rim, and each of said yieldable stud-engaging portions having their edges at the slits in contact with other yieldable stud-engaging portions adjacent to the stud-receiving aperture to cooperate with the continuous rolled rim and prevent crushing of said socket.

MOSES F. CARR.